3,361,708
STABILIZATION OF POLYCARBONAMIDES
John M. Mersereau, Cheshire, Russell L. Seelig, Jr., New Haven, and Paul J. Mester, Naugatuck, Conn., assignors to Uniroyal, Inc., a corporation of New Jersey
No Drawing. Filed Oct. 30, 1962, Ser. No. 234,245
3 Claims. (Cl. 260—45.7)

This invention relates to improved polyamide compositions. More particularly, this invention relates to improved polyamide-organic chemical compositions, wherein the organic chemicals are those normally used in the compounding of natural and synthetic rubbers.

These organic chemicals function as an anti-oxidant for the polyamide and also increase the tensile strength of the polyamide.

Polyamides, particularly polycaprolactam (nylon 6) having the basic monomer unit

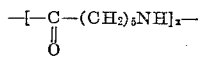

poly(hexamethylene adipamide) (nylon 6, 6) having the basic monomer unit

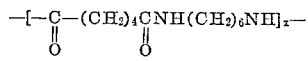

and the polyamide from 11-aminoundecanoic acid (nylon 11) having the basic monomer unit

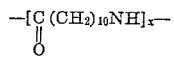

are useful for the preparation of molded, machined, and extruded articles and have been used for this purpose for some time. The polyamide compositions which are the subject of this invention are useful for these applications but, in addition, possess certain properties superior to those of the ordinary, uncompounded molding grades of nylon. In particular, the polyamide compositions of this invention exhibit superiority to ordinary nylon molding resin in tensile strength and in aged properties at elevated temperatures. These properties are of particular importance since nylon parts are commonly exposed to such temperatures when used in home air conditioners, in proximity to motors, and for automotive applications.

It is therefore an object of our invention to provide an improved polyamide composition which contains organic chemicals extracted from scrap rubber.

As mentioned in the foregoing, these new compositions comprise combinations of polyamides and organic chemicals (hereinafter referred to as "rubber chemicals"), the latter being those normally used to improve the mechanical and aging properties of rubber. The preferred method of obtaining these rubber chemicals for use in the compositions of this invention requires little in the way of equipment or elaborate synthesis and comprises the use (as a starting material) of old, compounded scrap rubber, a commodity readily available as worn and no longer useful automobile or other tires, tire tubes, rubber sheeting and other scrap rubber products. Such scrap rubber serves as a useful source for the rubber chemicals to be used in the preparation of the new compositions of matter of this invention. In order to obtain the rubber chemicals from old scrap rubber, it is necessary to extract them from the rubber by a suitable means, such as by the use of superheated water, hot methanol, hot ethylene glycol, ethyl ether, hot ethanol, or other known solvents for rubber chemicals which are not also solvents for rubber. Prior to extraction of the rubber chemicals, the scrap rubber may be mechanically milled or ground to reduce the size of the raw scrap rubber material. The standard apparatus employed in rubber reclaiming processes may be employed to reduce the size of raw scrap rubber. After extracting the rubber chemicals and removing all, including residual, solvent from them, the rubber chemicals may be added to the nylon either by extrusion-mixing, by mixing in a heated flask provided with an agitator, or by dissolving both the polymer and the rubber chemicals followed by flashing off the solvent, or by any other suitable means. Rubber chemicals, as obtained from compounded scrap rubber, contain a certain amount of volatile material which is undesirable, in some nylon applications, since its presence leads to excessive bubbling when the nylon is molded or extruded. This volatile matter, we have found, can readily be removed from the nylon by exposure of the latter to sufficiently high temperatures (200 to 300° C.) with the application of a vacuum, or without the use of a vacuum if suitable venting is provided.

As an additional improvement in the process of preparing these new compositions of matter, certain of the steps described above can be combined into one operation. Thus, it has been found that the treatment of a mixture of poly-(hexamethylene adipamide) and scrap rubber with a solvent, which is specific for the polyamide and the rubber chemicals and which is a non-solvent for the rubber, such as super heated water, hot methanol, or hot ethylene glycol, followed by the precipitation of the rubber chemicals and the nylon together, will produce an intimate mixture of two components of the compositions of this invention. By simply drying, removing undesired volatile matter by a suitable heat treatment, and pelletizing the nylon-rubber chemicals composition, a resin suitable for molding, extruding, and machining purposes, and having excellent physical properties is produced.

As an additional improvement, over and above those already stated, it has been found that, through the use of old, scrap, nylon-corded tires, a nylon-rubber chemical blend can be obtained without recourse to virgin nylon molding resin. That is, both the nylon and the rubber chemicals can be extracted from old nylon corded tires through the use of some suitable solvent such as super heated water, hot methanol, or hot ethylene glycol, as well as mixtures thereof. Subsequently, after removal of all, including residual, solvent and other volatiles by means of a suitable heat treatment, one of the compositions of matter of this invention is produced, certain properties of which are superior, for example, tensile strength and impact strength after heat-aging, to the corresponding properties of virgin nylon molding resin.

It is preferable to use cured scrap rubber rather than uncured scrap rubber as the source of the rubber chemicals. Uncured compounded scrap rubber contains sulfur and accelerators which would be harmful to nylon in that they would tend to crosslink, and thereby degrade, the nylon. In order to use uncured scrap rubber, such as "friction scrap," it would be necessary to separate the sulfur and accelerators from the rubber chemicals. This problem is not present when cured rubber is used, since the sulfur and accelerators are not present as such in cured rubber.

In addition to polycaprolactam (nylon 6), poly-(hexamethylene adipamide) (nylon 6, 6) and the polyamide from 11-aminoundecanoic acid (nylon 11), the present invention is also applicable to the improvement of properties of other polyamides. The general rule as to the effectiveness of the rubber chemicals of the present invention in stabilizing nylons is that the more polar nylons (those possessing a high ratio of nitrogen or oxygen to carbon in the monomer) are more efficiently stabilized by our rubber chemicals than are non-polar nylons. Since the polarity of nylons is roughly related to the melting points of the nylons, the higher melting nylons would be more benefited by the use of our rubber chemicals therewith than would the lower melting nylons. Thus, nylon 6, 6 (M.P. 255° C.) is more stabilized by our rubber chemicals than is nylon 6 (M.P. 205° C.) which, in turn, is more stabilized by our rubber chemicals than is nylon 11 (M.P. 185° C.). The beneficial effect of our rubber chemicals on poly-(hexamethylene sebacamide), nylon 6, 10 (M.P. 210° C.) is between the effects attained on nylon 6, 6 and nylon 11. Other high melting point nylons behave similarly to nylon 6 and nylon 6, 6. Such nylons include nylon 4, 6 (M.P. 295° C.), nylon 6, 1 (M.P. >300° C.), nylon 6T (M.P. 350° C.) and nylons made from aromatic diamines or phthalates which are known to possess high melting points. Certain other polar, but lower melting, nylons will behave similarly, such as polar mixed and polar polyurethane types of nylon. Non-polar nylons, such as nylon 12 (M.P. 180° C.), nylon 10, 10 (M.P. 194° C.) and nylon 5, 14 (M.P. 170° C.), are not as effectively stabilized with our rubber chemicals as are the more polar, higher melting nylons. As a general rule, nylons having melting points over 200° C. constitute the group which is most effectively stabilized and otherwise benefited by treatment with our rubber chemicals.

The rubber chemicals should preferably be present in an amount from 0.1% to 3.0%, based on the weight of polyamide present, less than 0.1% of rubber chemicals has no effect in producing superior heat aging properties. More than 3.0% rubber chemicals in the nylon results in some surface imperfections in the molded nylon. When the composition of matter of the present invention is prepared from nylon corded tires, it is necessary to control the amount of rubber to be extracted so that the correct amount of rubber chemcials is present in the final composition.

The following examples are intended to illustrate the preparation of the compositions of this invention but are not intended to restrict their preparation to these methods alone.

*Example 1*

1500 grams of cracked scrap auto and truck tires were extracted for two days with denatured ethanol in a one gallon Soxhlet extractor. The solvent was boiled off, leaving 63 grams of dark brown, viscous oil, $N_D^{25}$ 1.5432, specific gravity (25° C.) 0.998. It was dried over calcium chloride and further characterized by distillation (unpacked column) into two distinct fractions. Fraction 1 had a boiling range of 150–196° C. (6 mm.), a refractive index of $N_D^{25}$ 1.5273, and constituted 18% of the total charge to the column. Analysis by gas chromatography revealed at least 17 components in fraction 1, none being present in preponderant amount compared to the others. The infra-red spectrum of fraction 1 (neat, sodium chloride plate) revealed the following absorption peaks (wave length in microns): 3 w., 5.85 m., 6.1 w., 6.65 m., 6.85 s., 7.25 m., 7.65 w., 12.25 w., 13.45 m., 14.4 w.[1]. Fraction 2 (64%), of higher density than fraction 1, was a dark brown, very viscous liquid, had a boiling range of 199° to over 250° C. (6 mm.), and a refractive index of $N_D^{25}$ 1.5358 (indistinct due to opacity). The infra-red spectrum of this material possessed the following absorption peaks in microns (neat, sodium chloride plate): 3.45 v.s., 5.85 m., 6.25 m., 6.65 m., 6.85 s., 7.25 m., 7.6 m., 8.0 w., 11.45 w., 12.30 w., 13.4 s., 14.5 m.[1] After distillation, about 5% of grey solid, insoluble in benzene and other common organic solvents, remained. The remainder of the material charged to the column, 13% of the total, consisted of residual solvent and other low boiling components.

*Example 2*

Employing the crude, undistilled, solvent-free extract obtained as described in Example 1, 8.0 grams were extrusion-mixed into 400 grams of white virgin nylon poly-(hexamethylene adipamide) molding compound at 600° F. The product, a smooth, tan rod, was chopped into pellets suitable for molding. This product and white virgin nylon poly-(hexamethylene adipamide) molding compound were separately molded into specimen bars suitable for tensile strength and impact tests. Part of these molded bars were submitted to accelerated aging conditions in a circulating air oven for 7 days at 250° F. Subsequent to the aging, all of the bars, including the unaged bars, were moisture-conditioned to 50% relative humidity by boiling them for 24 hours in aqueous potassium acetate of 1.30 specific gravity; and they were then tested. Table I shows the results of these tests.

TABLE I

|  | A | B | C | D |
|---|---|---|---|---|
| Tensile Strength, p.s.i. | 7,120 | 4,350 | 8,400 | 8,250 |
| Elongation, percent | >150 | 10 | 260 | 260 |
| Notched Izod Type Impact, ft.-lbs./in. | 6.9 | 1.0 | 6.6 | 7.0 |
| Tensile Impact, ft.-lbs./in.² | 137 | 6 | 142 | 188 |

A=Virgin nylon 6, 6; B=Virgin nylon 6, 6, aged 7 days at 250° F.; C=Virgin nylon 6,6 to which 2% rubber chemicals were added; D=Virgin nylon, 6, 6, to which 2% rubber chemicals were added, aged 7 days at 250° F.

*Example 3*

The extract, as used in Example 2, was devolatilized by heating to 250° C./20 mm. and was extrusion-mixed at the 2% level into virgin nylon 6 (polycaprolactam) at 500° F., resulting in a rod which was smoother than the rod of Example 2 and was also tan. This rod was chopped and molded (as was some virgin nylon 6 molding compound) into impact bars, aged, and conditioned as described in Example 2. These were tested for tensile impact strength, the results of which tests are shown in Table II.

*Example 4*

The extract, as used in Example 3, was incorporated into nylon 11 at the 2% level by extrusion-mixing at 450° F. The resulting rod was chopped, molded (as was some virgin nylon 11), aged, diced, and tested for tensile impact strength, the results of which tests are also shown in Table II.

TABLE II

|  | E | F | G | H | I | J |
|---|---|---|---|---|---|---|
| Tensile Impact Strength, ft.-lbs./in.² | 263 | 6 | 247 | 247 | 10 | 79 |

E=Virgin nylon 6; F=Virgin nylon 6, aged 7 days at 250° F.; G=Virgin nylon 6, to which 2% rubber chemicals were added; H=Virgin nylon 6, to which 2% rubber chemicals were added, aged 7 days at 250° F.; I=Virgin nylon 11, aged 7 days at 250° F.; J=Virgin nylon 11, containing 2% rubber chemicals, aged 7 days at 250° F.

*Example 5*

The crude, solvent-free extract described in Example 1 was incorporated into virgin nylon 6, 6 [poly-(hexamethylene adipamide)] as described in Example 2 at the following levels: 0.5%, 1.0%, 2.0%, 3.0%. After chopping, molding, aging, and conditioning the resultant compositions, they were tested, the results being shown in Table III.

TABLE III

|  | K | L | M | N | O |
|---|---|---|---|---|---|
| Tensile Impact Strength, ft.-lbs./in.² | 11 | 153 | 192 | 191 | 199 |

K=Nylon 6, 6; L=Nylon 6, 6; containing 0.5% of rubber chemicals; M=Nylon 6, 6; containing 1.0% of rubber chemicals; N=Nylon 6, 6 containing 2.0% of rubber chemicals; O=Nylon 6, 6 containing 3.0% of rubber chemicals.
All samples aged 7 days at 250° F.

---

[1] w., m., s., and v.s. are terms commonly used in reporting infra-red spectra and signify, respectively, weak, medium, strong, and very strong absorption peaks.

Example 6

Rubber chemicals were obtained by extracting comminuted scrap rubber with hot ethanol in an autoclave. Ten gallons of the resulting solution was mixed with 10 pounds of virgin nylon molding resin, the solvent was boiled off and the mixture was devolatilized in vacuum at 200–300° C.; extruding and chopping the product yielded a nylon molding resin of superior properties compared to the same virgin nylon resin.

Example 7

Rubber chemicals, as obtained in the manner of Example 6, were mixed with nylon molding resin; the entire mix was dissolved in hot methanol at 200° C.; the solvent was flashed off; the volatile rubber chemicals were removed by the application of heat and vacuum; and the product was extruded and chopped. The product, when molded, exhibited superior physical properties. Dissolving the rubber chemicals and the nylon together forms a more intimate mixture of the materials than a physical mixing procedure.

Example 8

Seven pounds of scrap rubber was mixed with three pounds of virgin nylon molding resin and the entire mix was treated with a suitable solvent (such as super heated water, hot methanol, or ethylene glycol) for the nylon and the rubber chemicals. After filtering to remove the insoluble rubber, the intimate mixture of the two components of this invention was recovered by flashing off the solvent or by cooling or diluting with water so as to precipitate same. After all volatiles had been removed by the application of heat and vacuum, the product was extruded and chopped. The properties of the nylon-rubber chemical composition obtained by these means are shown in Table IV, column E. By comparing the data of column E with those of column A (properties of the virgin nylon molding resin alone), it is evident that the product containing the rubber chemicals possesses superior aged tensile strength.

Example 9

Comminuted nylon corded tires, from which about 70% of the rubber had been mechanically removed, were extracted with a 50% methanol in water solution, under 200 p.s.i. internal steam pressure, for four hours in a jacketed autoclave; the solution was separated from the rubber by filtration, and the solution of nylon and rubber chemicals was allowed to cool to room temperature, during which step the nylon, intimately mixed with rubber chemicals, precipitated. Solvent was removed from the mixture by filtration and drying, and volatile rubber chemicals were subsequently removed by heat-treating the resin composition for three hours at 260° C. under 1 mm. vacuum in a desiccator. The so obtained product was extruded and molded. The properties of this composition are shown in Table IV, column C. As is evident from the data of column C, the tensile strength, aged impact strength, and tensile impact strength of the nylon-rubber chemical composition are all superior to those of the virgin nylons, the properties of which are shown in columns A and B. When this nylon-rubber chemical composition was acetone extracted to remove the rubber chemicals, a resin, having the properties shown in column D, resulted. As is obvious from the data of column D, removal of the rubber chemicals has a detrimental effect on many of the physical properties of the resin.

TABLE IV

|  | A | B | C | D | E |
|---|---|---|---|---|---|
| Green Tensile, p.s.i. | 7,510 | | 8,210 | 7,850 | 7,920 |
| Aged [a] tensile, p.s.i. | 7,010 | | 8,890 | | 8,720 |
| Elongation, percent | >100 | | >100 | 18 | >150 |
| Green DWI, ft. lbs. | 18.7 | 19.3 | 4.0 | | |
| Aged 1 day at 250° F. in air | 6.4 | 3.4 | 4.4 | | |
| Aged 3 days at 250° F. in air | | 3.2 | 3.6 | | |
| Aged 7 days at 250° F. in air | (b) | (c) | 1.6 | | |
| Modified Charpy Impact, ft.-lbs./inch | 27 | | 21 | 7 | |
| Tensile Impact, ft.-lbs./square inch | 43 | | 84 | 14 | 208 |

[a] Aged 7 days at 250° F. in circulating air oven.
[b] Below 0.4 ft.-lbs.
[c] Below 1.4 ft.-lbs.
A. Virgin nylon molding resin; B. Virgin nylon molding resin, plasticized. (Du Pont's Zytel 101-2315); C. Scrap tire cord nylon containing rubber chemicals; D. C, after removal of rubber chemicals by acetone extraction; E. A plus added rubber chemicals.

DWI=Drop weight impact on 2½" x 1 9/16" x ¾" (height) boxes.

Tensile tests were performed on 4.75 g., 5 in. dumbbells.

An examination of the data in Tables I–IV shows the effects of the rubber chemicals of the present invention on nylon. The tables clearly show that the addition of the rubber chemicals of the present invention substantially increases the aged tensile, aged impact, and aged tensile impact strength of nylon molding resins. The addition of the rubber chemicals also increases the unaged tensile strength of nylon resin.

Having thus described our invention what we claim and desire to protect by Letters Patent is:

1. A composition of matter comprising a synthetic linear polycarbonamide containing recurring amide groups as an integral part of the polymer chain and from 0.1 to 3.0% by weight, based on the weight of said polycarbonamide, of a stabilizer, said stabilizer possessing a refractive index ($N_D^{25}$) of about 1.5432 and a specific gravity at 25° C. of about 0.998 and being obtained by contacting cured scrap rubber tires with ethanol, separating the undissolved scrap rubber from said ethanol, removing the ethanol and recovering the resulting extract, as said stabilizer.

2. The composition of claim 1 in which the polycarbonamide is polycaprolactam.

3. The composition of claim 1 in which the polycarbonamide is poly-(hexamethylene adipamide).

References Cited

UNITED STATES PATENTS

| | | | |
|---|---|---|---|
| 2,386,707 | 10/1945 | Moore et al. | 260—2.3 |
| 2,685,570 | 8/1954 | Verdiers | 260—2.3 |
| 3,160,665 | 12/1964 | Siegrist et al. | 260—49.95 XR |
| 3,216,969 | 11/1965 | Cyba | 260—45.75 |

OTHER REFERENCES

Winspear, ed., Vanderbilt Rubber Handbook, R. T. Vanderbilt, N.Y., 1958, pp. 154–156 and 183–188.

Nourry, ed., Reclaimed Rubber, MacLaren, London, 1962, p. 57.

Weissberger, ed., Technique of Organic Chemistry, vol. III, Interscience, N.Y., 1955, pp. 1–12.

Hildebrand et al.: The Solubility of Nonelectrolytes, Reinhold, N.Y., 1950, p. 142.

DONALD E. CZAJA, Primary Examiner.

L. J. BERCOVITZ, Examiner.

M. J. WELSH, J. A. KOLASCH, Assistant Examiners.